United States Patent
Jian

(10) Patent No.: US 8,077,455 B2
(45) Date of Patent: Dec. 13, 2011

(54) SERVER CABINET AND COMPUTER SERVER SYSTEM USING SAME

(75) Inventor: Zh-Wei Jian, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 253 days.

(21) Appl. No.: 12/581,901

(22) Filed: Oct. 20, 2009

(65) Prior Publication Data

US 2011/0069436 A1   Mar. 24, 2011

(51) Int. Cl.
*H05K 7/14* (2006.01)
(52) U.S. Cl. ........... 361/679.48; 361/679.33; 361/724; 361/725; 248/906; 312/223.1; 312/223.2
(58) Field of Classification Search .......... 361/727
See application file for complete search history.

(56) References Cited

U.S. PATENT DOCUMENTS

| | | | | |
|---|---|---|---|---|
| 5,216,579 A * | 6/1993 | Basara et al. | ............ | 361/679.46 |
| 5,737,189 A * | 4/1998 | Kammersgard et al. | ...... | 361/726 |
| 5,854,904 A * | 12/1998 | Brown | .......................... | 710/100 |
| 6,421,243 B1 * | 7/2002 | Ives et al. | ........................ | 361/725 |
| 6,496,366 B1 * | 12/2002 | Coglitore et al. | ......... | 361/679.46 |
| 6,769,551 B2 * | 8/2004 | Rafferty et al. | .................. | 211/26 |
| 7,307,834 B2 * | 12/2007 | Jones et al. | .............. | 361/679.55 |
| 7,791,890 B2 * | 9/2010 | Ishida | ............................ | 361/727 |
| 2009/0061691 A1 * | 3/2009 | Ewing et al. | .................. | 439/654 |

* cited by examiner

*Primary Examiner* — Jinhee Lee
*Assistant Examiner* — Anthony Q Edwards
(74) *Attorney, Agent, or Firm* — Altis Law Group, Inc.

(57) ABSTRACT

A server cabinet includes a rack and a common power supply received in the rack. The rack defines an interior space configured for accommodating a plurality of servers therein. Each server has an electrical plug at an outer side thereof. The common power supply includes a power input socket and a plurality of power output sockets. The power output sockets are configured to electrically connect to the server electrical plugs, respectively. The common power supply is configured for receiving AC power from an external power source via the power input socket, and converting the AC power to DC power and outputting the DC power to the servers via the power output sockets.

9 Claims, 5 Drawing Sheets

SERVER CABINET AND COMPUTER SERVER SYSTEM USING SAME

BACKGROUND

1. Technical Field

The present disclosure relates to computer servers, and more particularly to a server cabinet providing a common power supply for servers accommodated therein and a computer server system using the same.

2. Description of Related Art

Computer server systems often include multiple standard servers mounted in a standard server cabinet. Each server is a stand-alone computer that includes many electric components, such as one or more processors, RAM, fixed disks, AC to DC power supplies, and the like.

For unified management, the servers are arranged in the server cabinet one-by-one from bottom—to top. Each server has a standard rectangular profile, and extends from near a front end of the server cabinet to near a rear end of the server cabinet. Each server includes a power socket at the back thereof for electrically connecting the server to an external power source via a power supply line. The power supply of each server receives AC voltage from the external power source via the power socket, converts the AC electric power to DC electric power which is then supplied to the server. Accordingly, when multiple servers are installed in the server cabinet, a plurality of power supply lines are required to interconnect servers and the external power source, a complicated and inefficient arrangement. The server power supply lines also occupy significant space in the rear of the cabinet, impeding outflow of air, thereby limiting system cooling and endangering the system.

It is thus desirable to provide a server cabinet which can overcome the described limitations.

DETAILED DESCRIPTION

Figure 1:
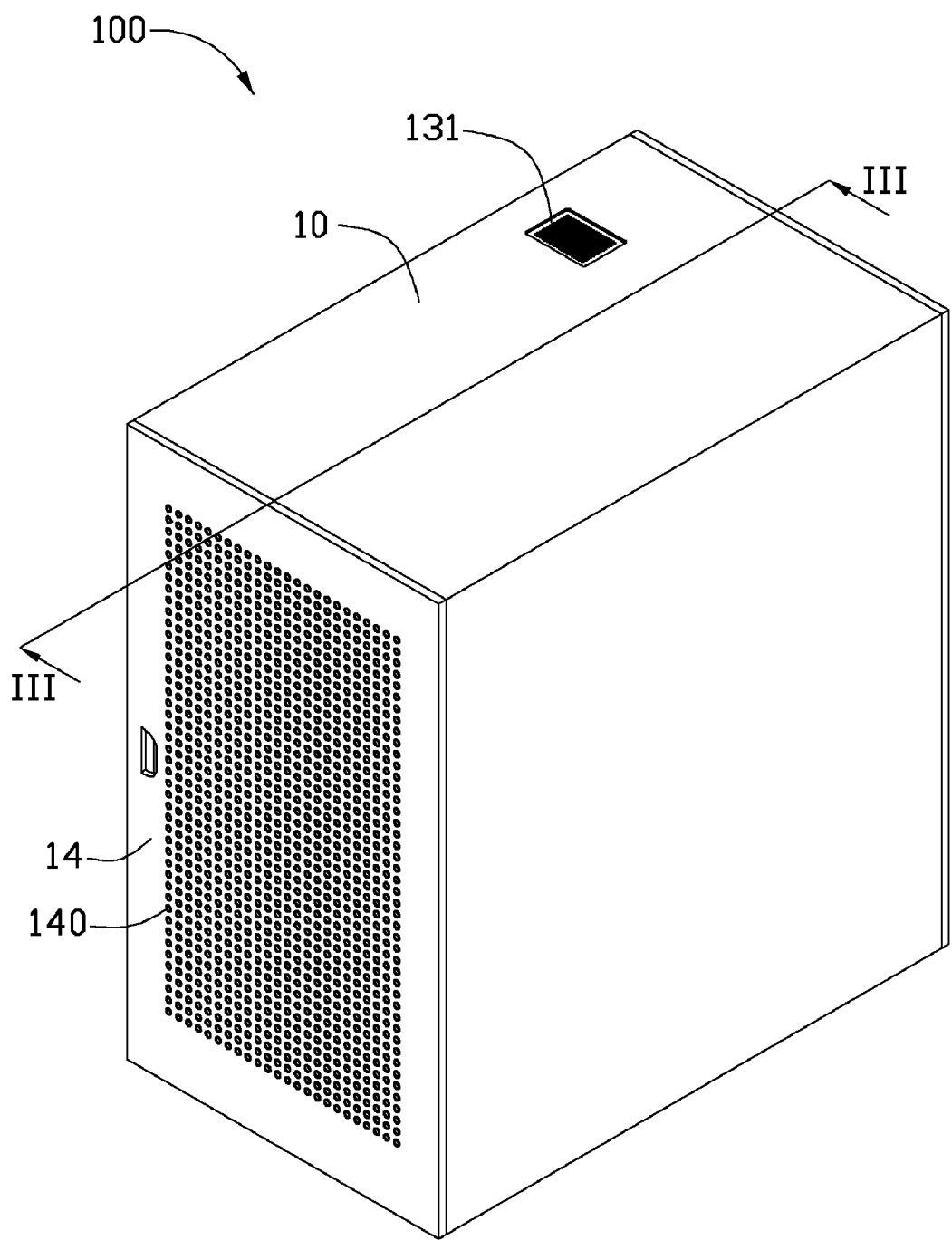
FIG. 1 is an isometric, assembled view of a computer server system in accordance with an exemplary embodiment of the present disclosure.

Reference will now be made to the drawing figures to describe the present server cabinet in detail.

Figure 2:
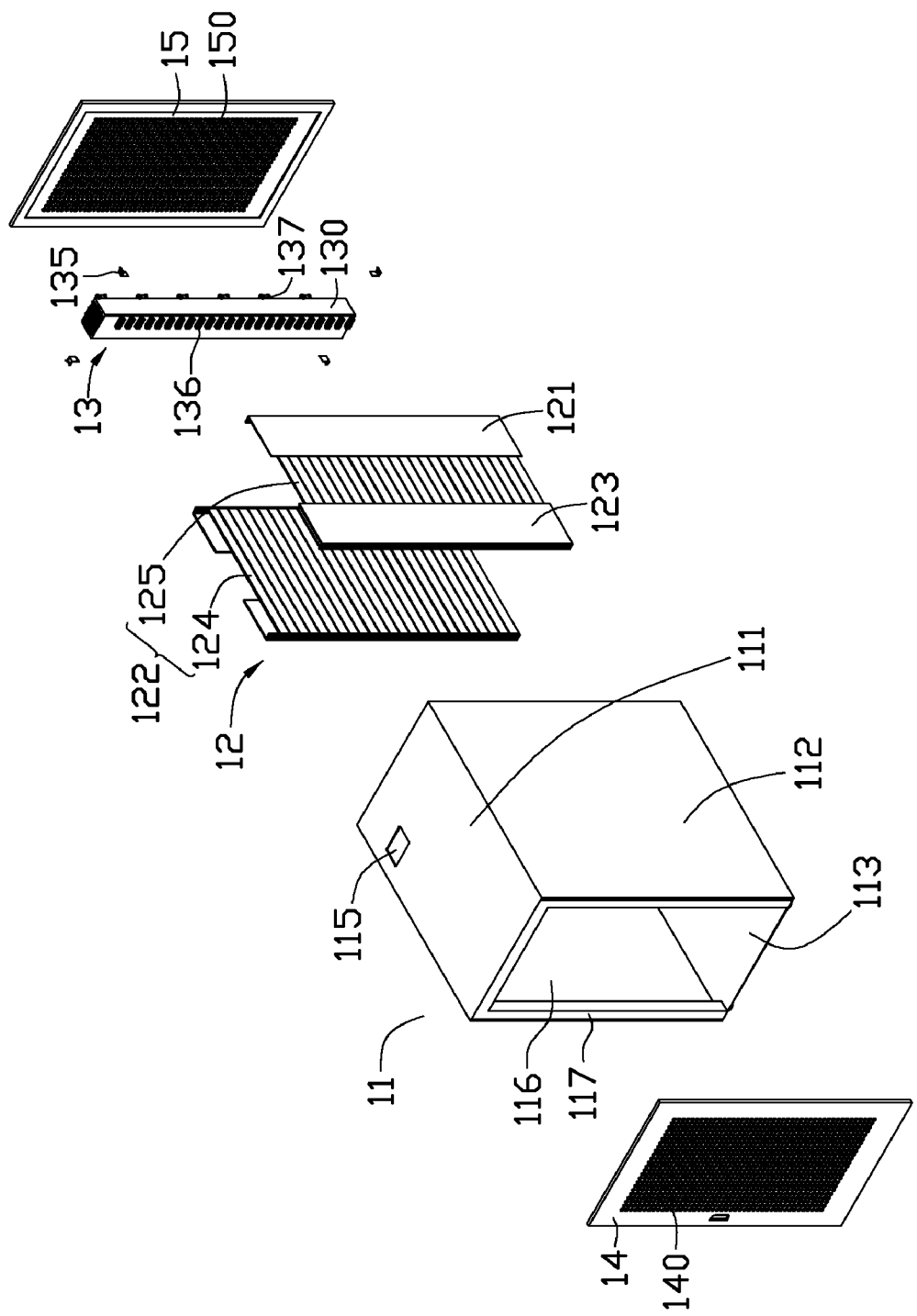
FIG. 2 is an isometric, exploded view of a server cabinet of the present disclosure, housing a computer server system such as, for example, that of FIG. 1.
Figure 3:
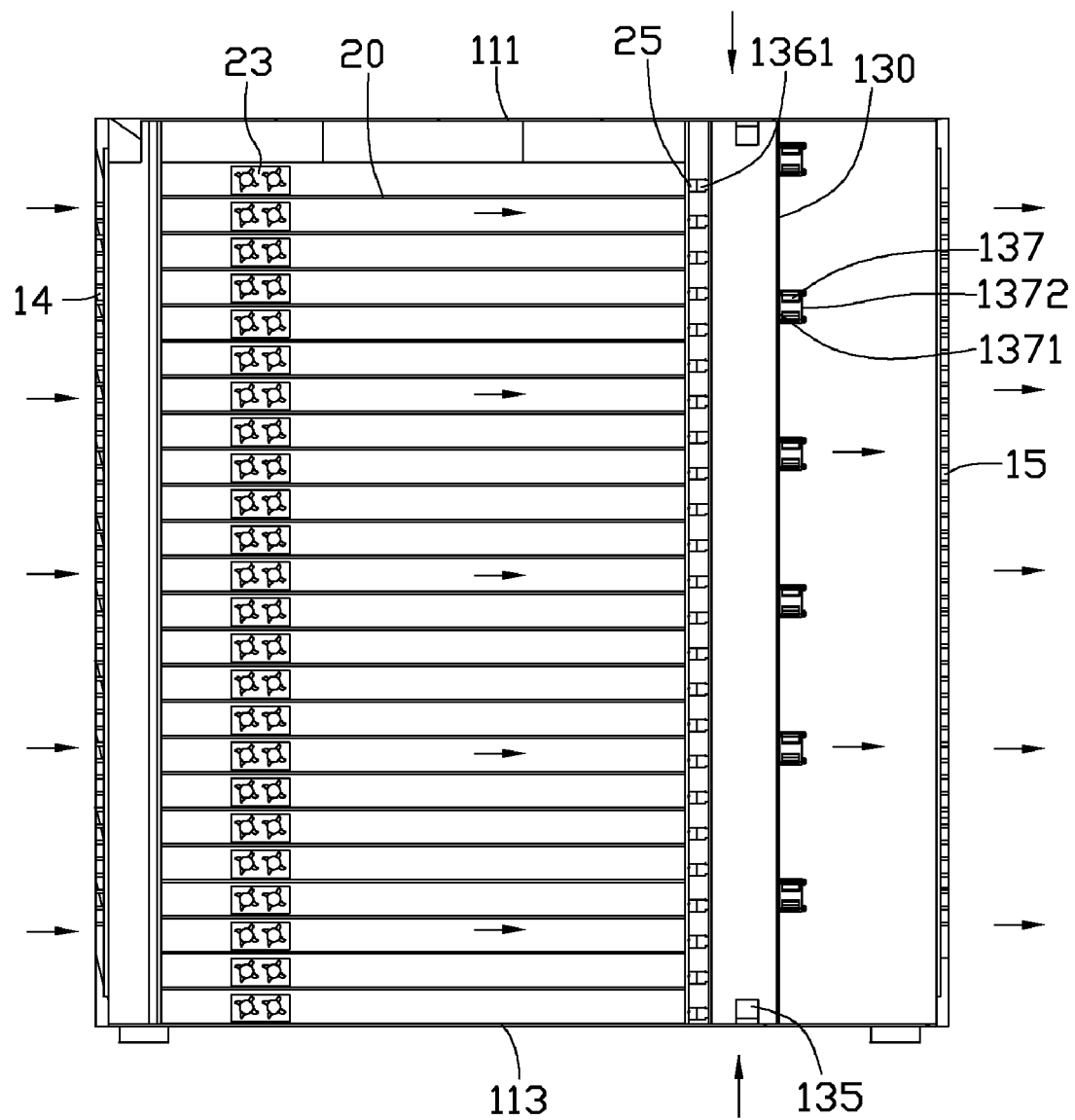
FIG. 3 is a schematic, cross-sectional view of FIG. 1, taken along line thereof.
Figure 4:
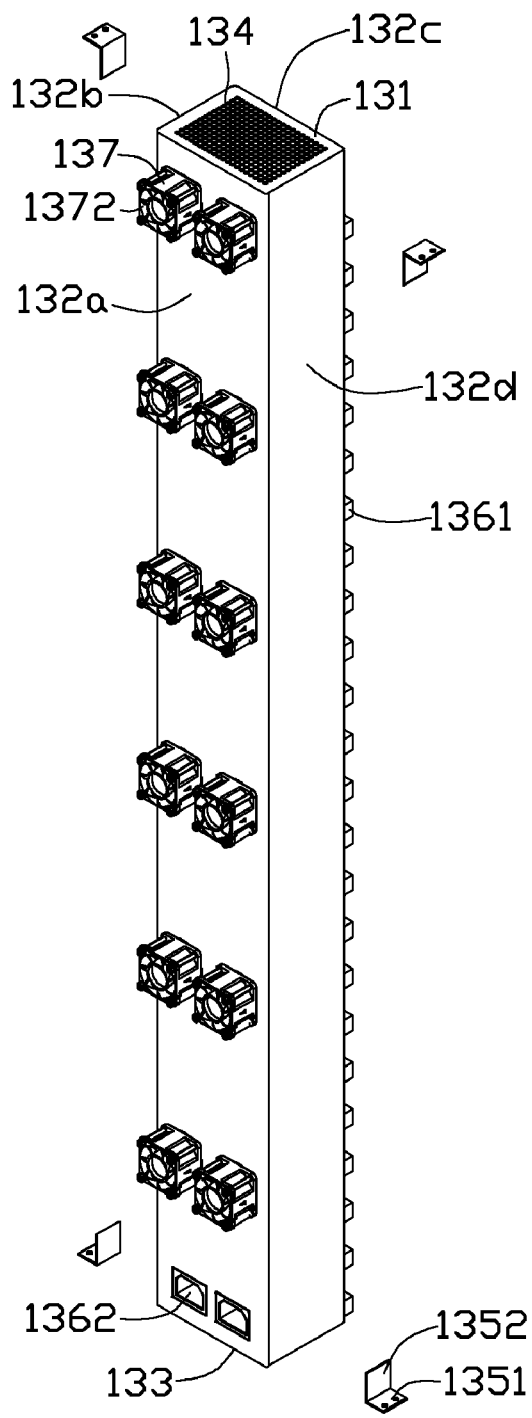
FIG. 4 is an enlarged view of a common power supply of the server cabinet of FIG. 2.

Referring to FIG. 1, a computer server system 100 according to an exemplary embodiment of the present disclosure is shown. Referring also to FIGS. 2-4, the computer server system 100 can be housed in a server cabinet 10, and a plurality of servers 20 are accommodated therein. Each server 20 has a standard rectangular profile. The server cabinet 10 can receive, in this embodiment, at most twenty-four servers 20 therein. A plurality of through holes 21 (shown in FIG. 5) are defined in front and rear sides of each server 20, respectively. Each server 20 includes a plurality of drawing fans 23 therein and an electrical plug 25 at the back thereof.

Referring to FIG. 2, the server cabinet 10 includes a rack 11, a supporting frame 12 received in the rack 11, and a common power supply 13 at the back of the supporting frame 12. The rack 11 includes a rectangular top wall 111, a bottom wall 113 parallel to the top wall 111, a left sidewall 117 and a right sidewall 112 respectively connected between two corresponding opposite sides, i.e., left and right sides, of the top and the bottom walls 111, 113, and a front door 14 and a back plate 15 respectively connected between another two corresponding opposite sides, i.e., front and rear sides, of the top and the bottom walls 111, 113. The top wall 111, the bottom wall 113, the left and the right sidewalls 117, 112 cooperatively define a rectangular receiving space 116 for receiving the servers 20 therein. Each of the top and the bottom walls 111, 113 defines an opening 115 (wherein only the opening 115 of the top wall 111 is visible in FIG. 2) at a position adjacent to the back plate 15. The opening 115 of the top wall 111 and the opening 115 of the bottom wall 113 are vertically aligned to each other. The receiving space 116 communicates with an exterior of the server cabinet 10 via the openings 115. Each of the front door 14 and the back plate 15 defines a plurality of air ventilation holes 140, 150 therein. The front door 14 and the back plate 15 are pivotally attached to the front and the back of the rack 11, respectively, so that the front door 14 and the back plate 15 can be opened and closed relative to the rack 11 according to need.

The supporting frame 12 includes two front vertical walls 123, two rear vertical walls 121 and a plurality of pairs of rails 122 therebetween. When the supporting frame 12 is installed in the rack 11, the front vertical walls 123 are at a front side of the rack 11, with the front vertical walls 123 abutting the left and the right sidewalls 117, 112, respectively. The rear vertical walls 121 are at the back of the rack 11, with the rear vertical walls 121 abutting the left and the right sidewalls 117, 112, respectively. Heights of the front and the rear vertical walls 123, 121 are substantially equal to those of the left and the right sidewalls 117, 112. The front and the rear vertical walls 123, 121 are fixed to the left and the right sidewalls 117, 112 of the rack 11 with top and bottom ends abutting the top and bottom walls 111, 113, respectively.

Each pair of rails 122 includes a first rail 124 connected between the front and the rear vertical walls 123, 121, at the left side of the rack 11, and a second rail 125 connected between the front and the rear vertical walls 123, 121, at the right side of the rack 11. The first rail 124 and the second rail 125 of each pair of rails 122 are on the same level. The pairs of rails 122 are spaced equally from each other bottom-to-top. Each pair of rails 122 supports a server 20 thereon.

Referring to FIG. 4, the common power supply 13 includes an elongated, hollow casing 130, a circuit board (not shown) received in the casing 130, a plurality of fixing elements 135 at top and bottom ends of the casing 130, and a plurality of power sockets 136 and drawing fans 137 mounted at an outer surface of the casing 130. The casing 130 has a height substantially equal to those of the front and the rear vertical walls 123, 121. The casing 130 includes a rectangular top surface 131, an opposite rectangular bottom surface 133 parallel to the top surface 131 and four lateral surfaces interconnected between four peripheral sides of the top and the bottom surfaces 131, 133 wherein the four lateral surfaces include, in sequence, a front surface 132a, a left surface 132b, a rear surface 132c and a right surface 132d. Each of the top and the bottom surfaces 131, 133 is substantially the same size as each of the openings 115 of the top and the bottom walls 111, 113. A plurality of through holes 134 are defined in each of the top and the bottom surfaces 131, 133. When the server cabinet 10 is assembled, the casing 130 of the common power supply 13 abuts the top and the bottom walls 111, 113 with the top and bottom surfaces 131, 133 at the openings 115, respectively. Thus, an interior of the casing 130 communicates with the exterior of the server cabinet 10 via the through holes 134 and the openings 115. Each of the fixing elements 135 includes a first fixing tab 1351 and a second fixing tab 1352 extending perpendicularly from the first fixing tab 1351. In this embodiment, four fixing elements 135 are deployed, with two at a top end of the casing 130. The first fixing tabs 1351 of the two are connected to the top wall 111, and the second fixing tabs 1352 of the two connected to the left and the right surfaces 132b, 132d of the casing 130, respectively. The other two fixing elements 135 are at a bottom end of the casing 130, respectively. The first fixing tabs 1351 of the other two fixing elements 130 are connected to the bottom wall 113, and the second fixing tabs 1352 of the other two fixing elements 130 are connected to the left and the right surfaces 132b, 132d of the casing 130, respectively.

The power sockets 136 include a plurality of power output sockets 1361 at the rear surface 132c of the casing 130 and two power input sockets 1362 at the front surface 132a of the casing 130. Each of the power output sockets 1361 and the power input sockets 1362 is electrically connected to the circuit board of the common power supply 13. The power output sockets 1361 are arranged bottom-to-top and equally spaced from each other. The power output sockets 1361 of the common power supply 13 correspond to the electrical plugs 25 server 20, respectively. Each of the power output sockets 1361 is configured for electrically connecting an external power source to the electrical plug 25 of a corresponding server 20. The power input sockets 1362 are arranged side-by-side and at the bottom end of the front surface 132a of the casing 130. The power input sockets 1362 are redundant. When used, one of the power input sockets 1362 is electrically connected to the external power source via a power supply line. Thus, the common power supply 13 can receive AC power from the external power source via the power input socket 1362, convert the AC power to DC power via circuitry provided on the circuit board and finally output the DC power to the servers 20 via the power output sockets 1361, respectively. The drawing fans 137 are mounted at the front surface 132a of the casing 13 and above the power input sockets 1362, with each defining an air inlet 1371 communicating with the interior of the casing 13 and an opposite air outlet 1372 facing the back plate 15 of the server cabinet 10.

Figure 5:
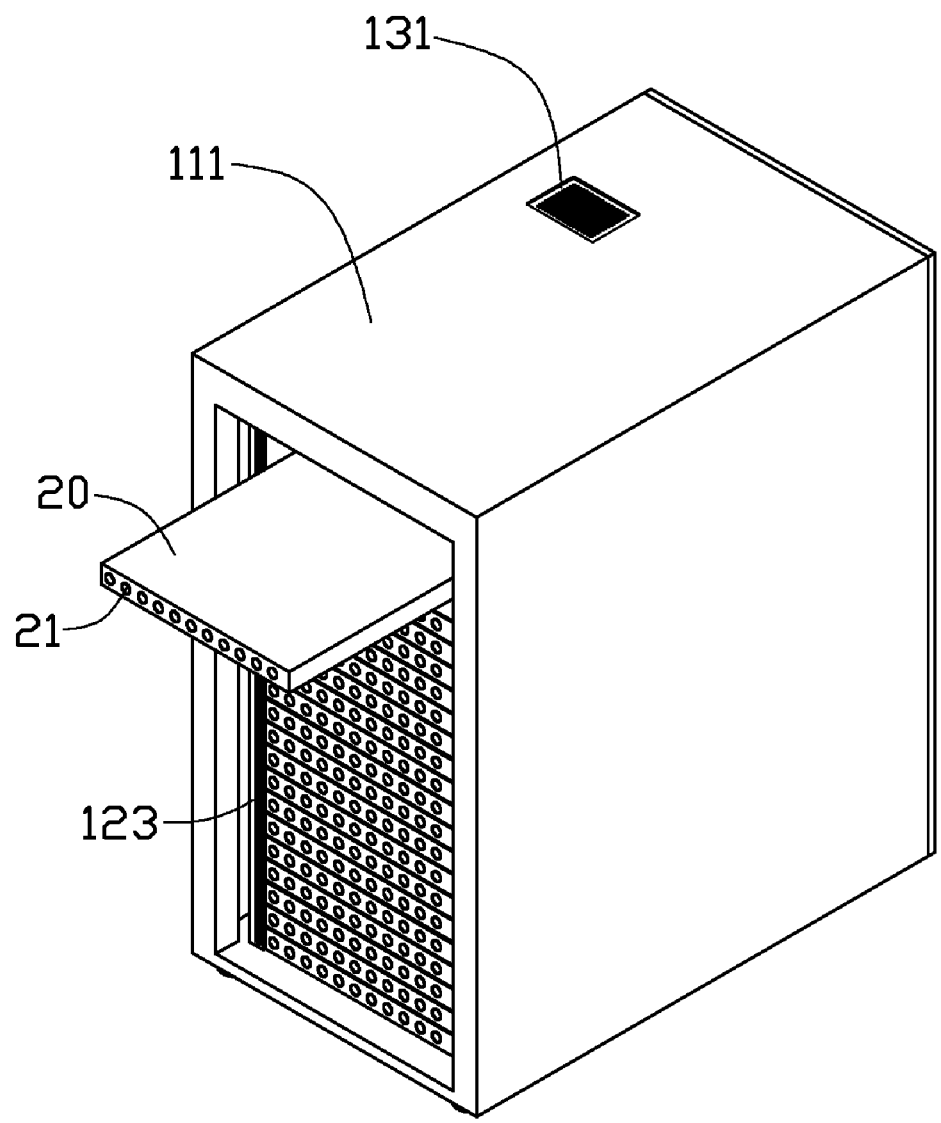
FIG. 5 is a schematic view of a server being inserted into the server cabinet, from which a front door has been omitted.

When assembled, the supporting frame 12 is received in the receiving space 116 of the server cabinet 10, the common power supply 13 is mounted at the back of the supporting frame 12, and the servers 20 are stacked bottom-to-top on the supporting frame 12 with the electrical plugs 15 connected with the power output sockets 1361 of the common power supply 13, respectively. Referring to FIG. 5, when installed in the server cabinet 10, a server 20 is positioned at the front end of the server cabinet 10 aligned with a corresponding pair of rails 122 of the supporting frame 12, then slid horizontally from the front end of the server cabinet 10 towards the rear end of the server cabinet 10 along the corresponding pair of rails 122 until the electrical plug 25 of the server 20 is received in a corresponding power output socket 1361 of the common power supply 13. At this time, the server 20 is entirely received in the server cabinet 10 and electrically connected with the common power supply 13.

During operation, the common power supply 13 converts AC power received by the power input socket 1362 to DC power which is then output to the servers 20, respectively. The drawing fans 23 of each server 20 draw cooling air into the server cabinet 10 through the servers 20 front-to-rear to dissipate heat from the servers 20. As indicated by arrows in FIG. 3, air from outside a front side of the server cabinet 10 flows into the server cabinet 10 via the air ventilation holes 140 of the front door 14, then into each server 20 via the through holes 21 at the front side server 20 to exchange heat with the servers 20 and thus exit server 20 via the through holes 21 at the back server 20. The hot air flows out of the server cabinet 10 via the air ventilation holes 150 of the back plate 15. Simultaneously, the drawing fans 137 of the common power supply 13 draw air into the interior of the casing 130 and through the circuit board to dissipate heat therefrom. Air enters the casing 130 of the common power supply 13 via the openings 115 and the through holes 134, exchanges heat with the circuit board, and flows out of the casing 130 via the air inlets 1371 and the air outlets 1372 of the drawing fans 137. Finally, the hot air flows out of the server cabinet 10 via the air ventilation holes 150 of the back plate 15 to dissipate the heat from the common power supply 13.

Since the common power supply 13 of the server cabinet 10 converts AC power to DC power and the multiple power output sockets 1361 output DC power to the servers 20 respectively, each installed server 20 receives DC power by only one supply line to the power input socket 1362 of the common power supply 13 and the external power source, such that connection of server 20 to the external power source is considerably simplified. As well, the number of required power supply lines greatly decreases, increasing empty space between the back server 20 and the back plate 15. Thus, the hot air server 20 and the common power supply 13 can flow out of the server cabinet 10 more smoothly. In another aspect, since the common power supply 13 is provided in the server cabinet 10 for providing power supply to the servers 20, separate power supplies are no longer needed for each individual server 20, increasing inner space of each server 20 for accommodating more electronic components therein, increasing performance.

It is to be understood, however, that even though numerous characteristics and advantages of the disclosure have been set forth in the foregoing description, together with details of the structure and function of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A server cabinet for accommodating a plurality of servers each comprising an electrical plug at an outer side thereof, the server cabinet comprising:
   a rack comprising a top wall, an opposite bottom wall and two sidewalls respectively connected between two corresponding opposite sides of the top and the bottom walls, and defining an interior space for accommodating the servers therein, each of the top and bottom walls defining an opening therein;
   a common power supply received in the rack and extending between the top and bottom walls of the rack, the common power supply comprising:
   an elongated, hollow casing arranged between the top and the bottom walls of the rack, the casing defining a plurality of through holes in top and bottom surfaces thereof, the top and bottom surfaces being mounted in the openings of the top and bottom walls of the rack, respectively, and an interior of the casing communicating with an exterior of the server cabinet via the through holes and the openings;

a power input socket disposed on an outer surface of the casing; and a plurality of power output sockets disposed on the outer surface of the casing and spaced equally from each other, the power output sockets for electrically connecting to the electrical plugs, respectively, the common power supply being configured for receiving AC power from an external power source via the power input socket, and then converting the AC power into DC power and outputting the DC power to the servers via the power output sockets; and a plurality of drawing fans mounted at the outer surface of the casing, each drawing fan defining an air inlet communicating with the interior of the casing and an opposite air outlet.

2. The server cabinet of claim 1, further comprising a plurality of fixing elements at top and bottom ends of the common power supply, each of the fixing elements at the top end comprising a fixing tab connected with the top wall and another fixing tab connected with the common power supply, and each of the fixing elements at the bottom end comprising a fixing tab connected with the bottom wall and another fixing tab connected with the common power supply.

3. The server cabinet of claim 1, wherein the rack further comprises a front door and a back plate each connected between another two corresponding opposite sides of the top and the bottom walls, respectively, each of the front door and the back plate defining a plurality of air ventilation holes therein.

4. The server cabinet of claim 1, further comprising a supporting frame received in the rack, the supporting frame comprising two first vertical walls adjacent to a front side of the rack, two second vertical walls adjacent to the back of the rack, and a plurality of pairs of rails arranged between the first vertical walls and the second vertical walls, each pair of rails being configured for supporting a server thereon.

5. The server cabinet of claim 4, wherein each pair of rails comprises a first rail connected between one of the first vertical walls and one of the second vertical walls, and a second rail connected between the other first vertical wall and the other second vertical wall, the first rail and the second rail of each pair of rails being level with each other.

6. A computer server system comprising:

a rack comprising a top wall, an opposite bottom wall and two sidewalls each connected between two corresponding opposite sides of the top and the bottom walls, respectively, wherein an interior space is defined among the top wall, the opposite bottom wall and the sidewalls, and each of the top and the bottom walls defines an opening;

a plurality of servers received in the interior space of the rack and stacked bottom-to-top, each server comprising an electrical plug at an outer side thereof;

a common power supply extended between the top and the bottom walls, and comprising:

an elongated, hollow casing between the top and the bottom walls of the rack, the casing defining a plurality of through holes in each of top and bottom surfaces thereof, and the openings of the top and the bottom walls of the rack facing the top and the bottom surfaces of the casing, respectively;

a power input socket; and a plurality of power output sockets, the power output sockets arranged bottom-to-top corresponding to the server electrical plugs, the power output sockets configured to electrically connect to the server electrical plugs, respectively, the common power supply configured for receiving AC power from an external power source via the power input socket, then converting the AC power to DC power and finally outputting the DC power to the servers via the power output sockets; and a plurality of drawing fans mounted at an outer surface of the casing, each of the drawing fans defining an air inlet communicating with the interior of the casing and an opposite air outlet.

7. The computer server system of claim 6, wherein the rack further comprises a front door and a back plate each respectively connected between another two corresponding opposite sides of the top and the bottom walls, each of the front door and the back plate defining a plurality of air ventilation holes therein.

8. The computer server system of claim 6, further comprising a plurality of fixing elements at top and bottom ends of the casing, each of the fixing elements at the top end comprising two fixing tabs respectively connected with the top wall and the top end of the casing, and each of the fixing elements at the bottom end comprising two fixing tabs respectively connected with the bottom wall and the bottom end of the casing.

9. The computer server system of claim 6, further comprising a supporting frame received in the rack, the supporting frame comprising two first vertical walls adjacent to a front side of the rack, two second vertical walls adjacent to the back of the rack, and a plurality of pairs of rails connected between the first vertical walls and the second vertical walls, each pair of rails comprising a first rail connected between one of the first vertical walls and one of the second vertical walls and a second rail connected between the other first vertical wall and the other second vertical wall, and the first rail and the second rail of each pair of rails being on the same level and adapted for supporting one server thereon.

\* \* \* \* \*